Feb. 21, 1933.  V. F. SLEZAK  1,898,146
WEIGHING SCALE
Filed Nov. 8, 1929  5 Sheets-Sheet 3

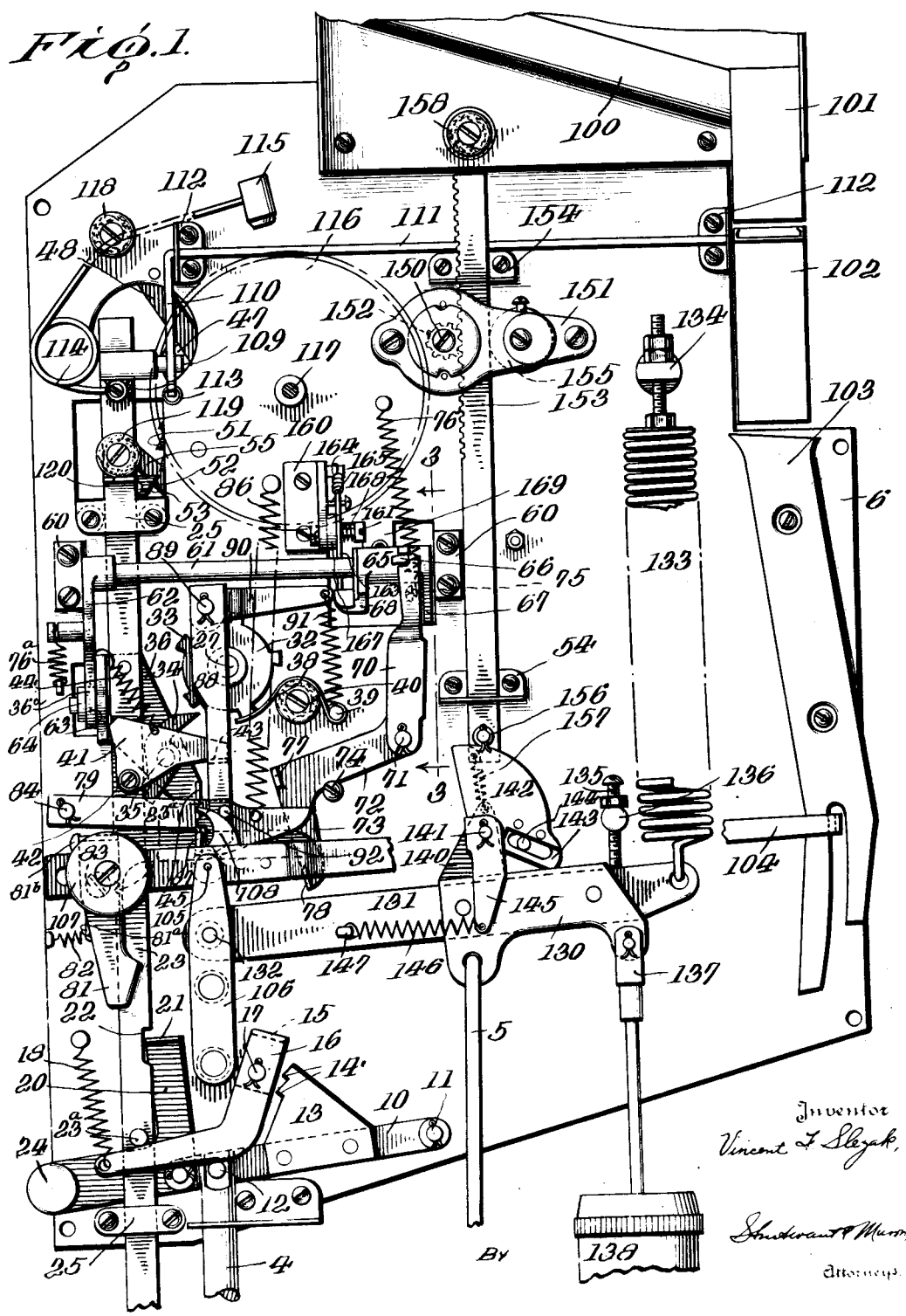

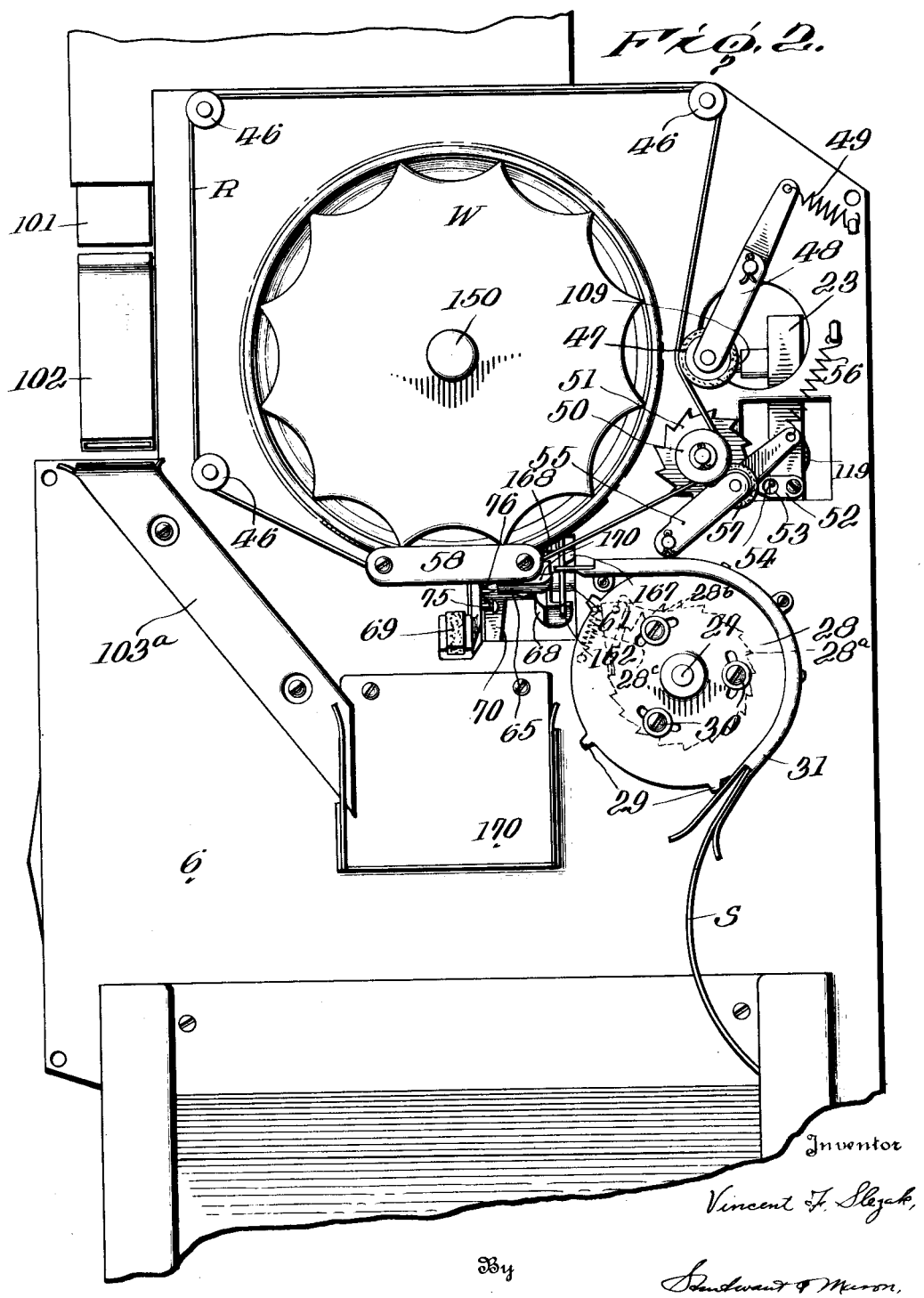

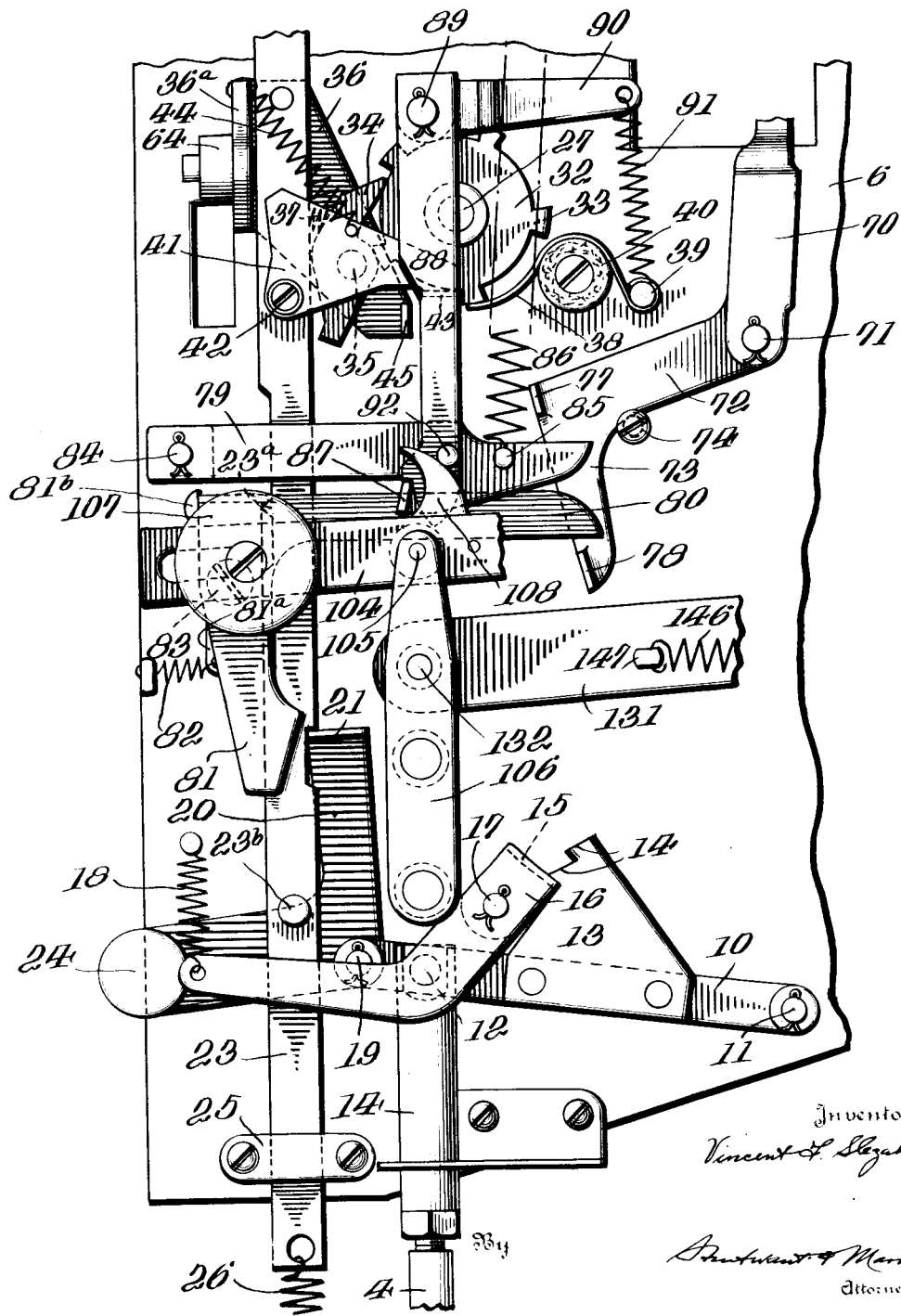

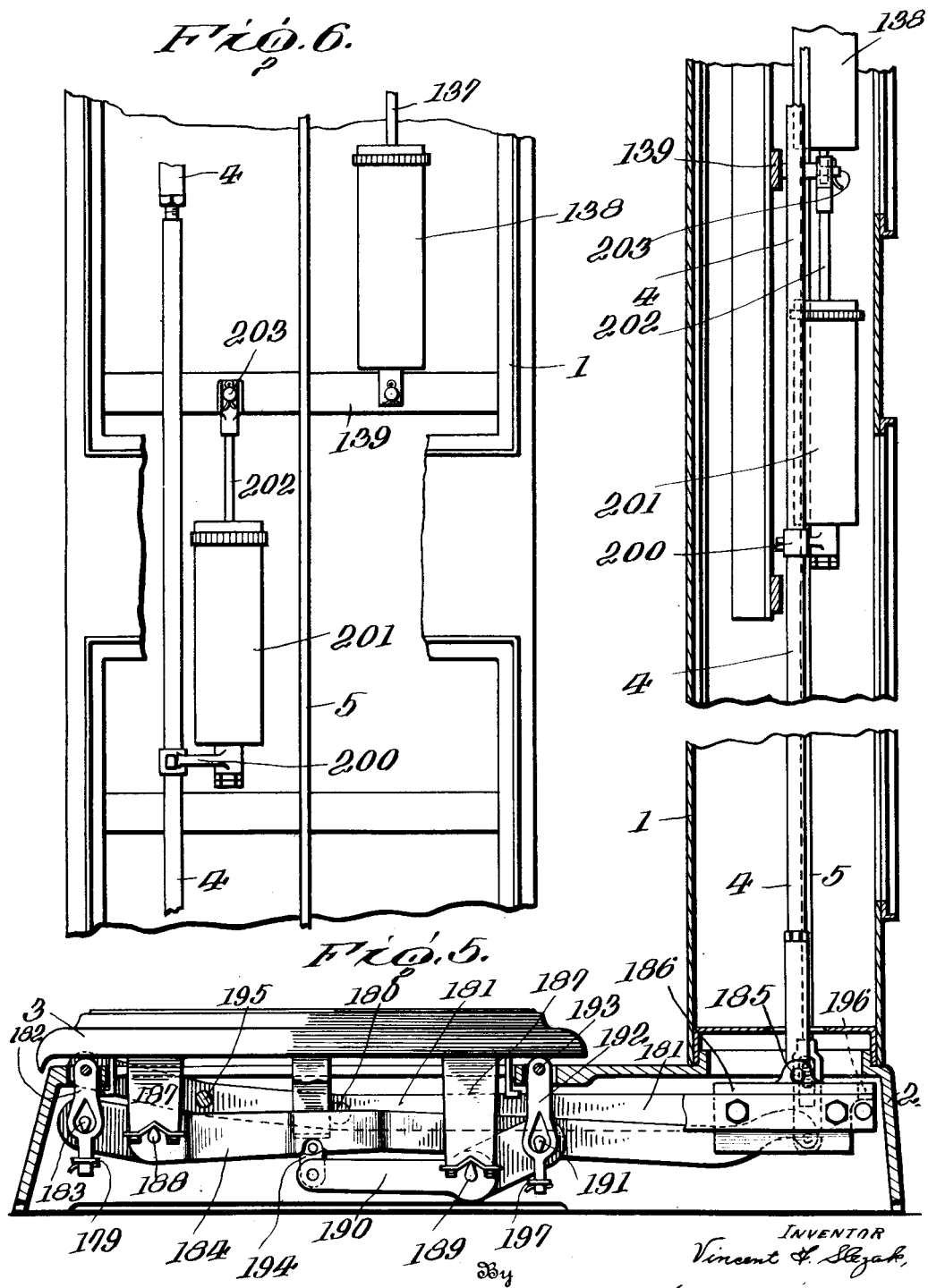

Patented Feb. 21, 1933

1,898,146

UNITED STATES PATENT OFFICE

VINCENT F. SLEZAK, OF JAMAICA, NEW YORK

WEIGHING SCALE

Application filed November 8, 1929. Serial No. 405,815.

This invention relates to improvements in weighing scales and more particularly concerns improvements in weighing scales of the type in which a ticket is printed with an indication of the weight and delivered following the insertion of a coin.

Weighing scales of this type are already well known, and the present invention relates to certain improvements in the same for the purpose of simplification of the construction and in the interests of accurate and long continued service.

One of the features of the present invention is the provision of a hammer shaft to which the hammer is secured, and which is located substantially horizontally in the mechanism and extends to a point opposite a power storing plunger, so that the shaft may be strongly and rigidly constructed and directly operated by the power-storing plunger during its return movement.

Another object of the invention is the inclusion on the hammer shaft of a device to operate the severing knife simultaneously with the printing.

A further object of the invention is the provision of devices for holding the platform in a partially depressed position when it has once been operated, whereby to prevent any further movements of the power-storing, printing and delivering mechanisms.

Still another object of the invention is the provision of a detent and detent releasing system for holding the platform in such position.

Still another object is to provide an association of such detent and detent releasing mechanism with the power-storing mechanism whereby to prevent a return movement of the power-storing mechanism.

A still further object of the invention is to provide a simple and compact arrangement of the parts upon one side of a supporting plate, the hammer and knife-operating parts extending through the plate, while the printing hammer head, the printing ribbon, the ticket strip and type wheel are located on the other or front side of the plate; for the purpose of preventing the passage of lint or débris from the ticket strip to the operating parts of the machine.

Still another object of the invention is the provision of a sealing device in which the sealing segment is carried by a pivoted weighing lever or arm, and during the rocking movement of the weighing lever presents different portions of its surface opposite a cooperating element located on the type wheel operating rack.

With these and other objects in view as will be more clearly set forth in the following specification and claims, an illustrative form of construction of the machine according to this invention is set forth on the accompanying drawings.

In these drawings:—

Figure 1 is a rear elevation of the operating mechanisms.

Fig. 2 is a front elevation of the printing wheel and ticket feeding mechanism, on a larger scale than Fig. 1.

Fig. 3 is a vertical sectional view substantially on line 3—3 of Fig. 1, but on a larger scale.

Fig. 4 is a rear elevation of parts of Fig. 1, on a larger scale and in a different working position.

Fig. 5 is a vertical sectional view through the base and lower portion of the column.

Fig. 6 is a detail view showing the connecting links and dashpots.

Fig. 7 is a detail view corresponding to Fig. 4, but with parts of the coin lever and of the power-releasing lever arm 81 cut away.

The coin-controlled ticket printing weighing machine according to the present invention comprises a framework upon which is mounted a platform having a relative movement under the actuation of the weight of the person being weighed, whereby firstly power is stored for accomplishing the operations of printing and delivering the ticket, and secondly the weight of the person is employed to actuate a printing system whereby the weight may be registered upon the ticket. The first operation of storing power produces the advancement of a ticket strip whereby a ticket is presented ready for printing, and power is stored by a suitable latching system for the later return of certain parts operated upon the coin release. When a coin is deposited in the machine, a printing hammer is permitted to print the ticket which has been presented, and then a knife severs this ticket, and finally the stored power is released. This stored power then resets the printing hammer and knife mechanism, and restores other operated elements to the initial position. When the person leaves the platform, the weight operated type device returns to its initial position as the platform regains its upper position. All parts are now ready for a further operation.

In the drawings, the machine is illustrated as having a hollow column 1 resting on and rigid with a base 2 which is supported on the floor or similar foundation. A movable platform 3 operates when loaded, by means to be described hereinafter, to produce firstly an upward movement of a power link 4, and secondly a downward movement of a weighing link 5. Within the upper part of the hollow column 1 is provided a mounting plate 6 supporting various mechanisms for the coin-controlled ticket printing and weighing operations.

A lever arm 10 is mounted on a fixed pivot 11 of the plate 6 and has a pivotal connection 12 to the power link 4 (Figs. 1 and 4). The lever 10 has fixed thereto a locking plate 13 having two teeth 14 thereon for engagement by the angularly bent end 15 of the detent 16 which is mounted on a fixed pivot 17 on the plate 6. The other end of the detent lever 16 is provided with a spring 18 likewise connected to the plate 6 whereby the detent lever 16 tends always to move in a clockwise direction. The extreme end of the lever 10 supports a pivot 19 for the plunger operating crank lever 20 which has an angularly bent end 21 to engage against the upper end wall of a notch 22 in the power storing plunger 23. The other end 24 of the crank lever 20 is a weight which tends constantly to move the lever 20 in a counter-clockwise direction, so that it presents its end 21 in the notch 22.

The plunger 23 is guided by fixed clips 25 on the plate 6 so that it can only move up and down. It is preferred to join the lower end of the plunger 23 by a spring 26 with a suitable part of the stationary frame to assist the weight of the plunger to produce the downward movement thereof.

A shaft 27 passes through the plate 6 and supports at the front of the plate a disk 28 having lugs 29 therein to engage the ticket strip S. The shaft 27 carries a ratchet wheel 28a, to which is secured a disk 28 by adjusting screws 30 whereby the axial position of the lugs 29 may be adjusted. The ticket strip S moves through a guide 31 which serves in conjunction with the disk 28 to maintain the ticket strip in position for accurate delivery opposite the printing position.

On the rear side of the plate the shaft 27 is provided with a disk 32 having a number of lugs 33 corresponding to the number of lugs 29, and adapted to be engaged by the upper end 34 of a pawl pivoted on pin 35 carried by a clip 36 rigid with the plunger 23. A spring 37 located between the plunger and the dog 34 tends to rock this dog into constant engagement with the disk 32. A blade spring 38 is engaged with a fixed pin 39 and a rubber cushion 40 on the plate 6, and acts as a brake on disk 32, and snaps behind the successive lugs or teeth 33. A pawl 28b pivoted to the main plate 6 and actuated by a spring 28c cooperates with the ratchet 28a to prevent retrograde movement of the feeding disk 32. A movement limiting pawl 41 is mounted by a pivot 42 on the plunger 23, and has an angularly bent end 43 to engage against the advancing side of the presented lug 33 (Fig. 4) to limit the clockwise movement of the disk 32, and thereby assure that the ticket strip shall be advanced by a definite distance at each operation. This pawl 41 is connected by a spring 44 with the bracket 36, and thus may be pressed by the plunger 23 against the disk 32, and held yieldingly thereat by the spring 44 while the plunger 23 completes its movement. The clip or plate 36 has an angularly bent portion 36a to cooperate with the dog 41 and prevent excessive counterclockwise movement thereof; and also a lug 45 to engage the trip lever 79 as will be set forth hereinafter.

On the front side of the plate 6 (Fig. 2) are provided guide rollers 46 for an inked ribbon R which is mounted around the type wheel W, being provided with a take-up idler 47 on a lever 48, energized by the spring 49. The driving roller 50 for the ribbon R is provided with a ratchet 51 which is engaged during the upward movement of the plunger 23 by a dog 52 pivotally mounted on the plunger, and provided with an aperture 53 engaging a pin 54 on the plunger, so that the dog 52 is held substantially horizontally and in its path encounters the ratchet 51 during the upward movement of the plunger 23, while it can rock clockwise during the downward movement of the plunger and thus pass the ratchet 51 without actuation thereof. A clamping lever 55 pivoted on the plate 6 and provided with a clamping spring 56 has a roller 57 engaged with the ribbon R opposite the driving roller 50, and provides a sufficient friction so that the roller is moved in one direction only, under the actuation of the dog 52. Beneath the type wheel W is provided a subframe 58 supporting a guide plate 59 so that the ribbon is maintained in proper position between the type wheel W and the end of the ticket strip S.

Brackets 60 support the transverse horizontal shaft 61 which has a bent crank arm 62 at its end adjacent the plunger 23, the bent end 63 of this crank providing a cam which cooperates with a resetting roller 64 carried on the angularly bent portion 36a of the plate 36, and serves during the downward movement of the plunger to rock the shaft 61 in a clockwise direction in Fig. 3. The other end of the shaft 61 is provided with a sleeve 65 having oppositely directed arms 66 and 67—68. The arm 67 projects through the plate 6 and carries in front of this plate the printing hammer face 69. The rearwardly extending arm 66 is engaged by the upstanding end of the sear 70 which is pivotally mounted on the fixed pin 71 of the plate 6, and comprises the laterally extending crank arm 72 having a downward extension 73 at its end. The clockwise movement of the sear 70 is limited by the stop pin 39, while the weight of its arm 72 tends to rock it constantly in a counterclockwise direction into engaging relationship with the shaft arm 66 and against the stop pin 74. The shaft arm 67 is provided with a pin 75 to engage the hammer and severing spring 76 which is supported at its upper end fixedly to the plate 6. The depending arm 73 of the sear is provided with two laterally projecting lugs 77, 78 (Figs. 1 and 4), between which are engaged the trip lever 79 and one end 80 of the power releasing crank lever whose downwardly directed end 81 is presented opposite the bent end 21 of the plunger actuating crank lever 20 when the latter is in its raised or power-stored position (Fig. 4). As shown in Figs. 4 and 7, the fixed pivot 83 on plate 6 carries the power-releasing lever 80, 81 and also a detent 81a which has a nose extending into a notch on the plunger 23 and beneath a ledge 23a thereof, as well as a lug 81b fitting against the loop of an angularly rebent portion of this lever 80, 81. The spring 82 tends constantly to rock the detent 81a toward the plunger 23.

The trip lever 79 is mounted on a fixed pivot 84, and is provided near its free end with a pin 85 for the tripping spring 86. The trip lever 79 is likewise provided with a laterally bent dog 87 which is engaged and retained by a projecting shoulder on the latching lever 88 which itself is mounted on a fixed pivot 89 of the frame and has a laterally directed extension 90 to engage the latching spring 91 whose other end is preferably engaged about the pin 39. The latching lever 88 also has a pin 92 and operates by the coin control.

The coin-controlled system comprises means (not illustrated) for the introduction of a coin into the machine, and terminating in a channel 100 down which the coin may pass to an upper chute section 101 which delivers it to the coin gate 102 and thence if the machine is ready for operation into the lower coin chute 103 where it is presented against the inwardly bent end of the coin lever 104, and finally escapes into the base of the machine. The coin lever 104 is pivoted on a pin 105 mounted in the plate 6 and a bracket 106 carried thereby. This coin lever 104 is provided with a counterweight 107 which may be adjusted to vary the sensitiveness of operation of the coin lever. The upwardly projecting trigger finger 108 is rigidly fastened to the coin lever 104 and may operate against the pin 92 to move the latching lever 88 in the manner to be described hereinafter.

The plunger 23 is provided near its top with a laterally projecting pin 109 which near the upper limit of its travel will encounter the angularly bent end 110 of a transverse shaft 111 which is journaled in the clips 112 on the plate 6, and supports the coin gate 102 at the right hand end (Fig. 1). A return spring 113 tends to move the coin gate 102 to a position out of alignment with the lower section 103 of the coin chute so that the coin will not enter the coin chute 103 unless the plunger 23 has moved into substantially its uppermost position. The plunger 23 likewise carries at its upper end a spring 114 having the clapper 115 on the end thereof for engagement, when the plunger is suddenly stopped in its downward movement, with the gong 116 shown in dotted lines in Fig. 1 as mounted on a pin 117 of the plate 6. The upward movement of the plunger 23 is limited by a cushion stud 118 on the plate 6 while its downward movement is limited and cushioned by the engagement of a similar cushion stud 119 mounted on the plunger 23 with the outwardly projecting shelf 120 on the upper guide clip 25.

The weighing link 5 is pivotally joined at its upper end with a clip plate 130 rigidly fastened to the weighing lever 131 which is pivoted on a pin 132 carried by the plate 6 and the bracket 106. At its other end the weighing lever 131 is connected to the weighing spring 133 which is adjustably secured on a stud 134 projecting from the plate 6. The upward movement of the weighing lever is limited by an adjustable stop screw 135 carried by a stud 136 on the plate 6. The clip plate 130 is also provided with a pivotal connection to the piston rod 137 of a dashpot 138 which at its lower end is fixedly connected to a frame member 139 (Fig. 6). An upstanding portion 140 of the clip plate 130 supports the pivot pin 141 of a sealing segment 142 which has a slotted member 143 rigidly fastened thereto and engaging the fixed pin 144 of the plate 6. This sealing segment 142 is likewise provided with a rigid projecting arm 145 which is connected to a tension spring 146 having its other end fastened to a pin 147 on the weighing lever 131.

The type wheel W with figure types for the weights, is carried by a shaft 150 passing through a suitable bearing in plate 6 and supported by a bracket 151 carried by the rear of said plate.

A stationary block Ar has an arrow, etc. type thereon to indicate the exact weight. Between the bracket 151 and plate 6 it is provided with a pinion 152 in mesh with the weighing rack 153, this rack being guided in the clips 154 for upward and downward movement. A roller 155 is likewise pivotally mounted between the bracket 151 and plate 6 to hold the weighing rack 153 accurately in mesh with the pinion 152. The lower end of the rack is provided with a roller 156 projecting therefrom and adapted to rest on the periphery of the sealing segment 142. A small tension spring 157 is connected to the lower end of the rack and to a suitable point on the clip plate 30. The upward movement of the rack 151 toward its "zero" position is cushioned by a cushion stud 158 fixed to the plate 6, and limited by the adjusting screw 135 engaging weighing arm 130.

A bracket 160 (Figs. 1 and 3) is secured at the back of the plate 6 and carries the pivot 161 of the knife blade 162 which extends through the plate 6, and in its open position is located beneath the path of the ticket strip S, and has a rearwardly extending end 163 engaged with the knife returning spring 164. A stop pin 165 limits the opening movement of the knife. The lever arm 68 on the shaft 61 has a laterally extending end 166 which projects beneath the knife 162, so that during the counterclockwise movement of the several arms and shaft 61 for printing, the knife 162 is ultimately struck and forced upward in a counterclockwise direction in Fig. 3, to produce the severing of the ticket from the strip S, in conjunction with the fixed knife blade 167. A small coil spring 168 is mounted about the pivot 161 to present the movable knife plate 162 against the fixed knife blade 167. The plate 6 is provided with apertures to receive the arms 67 and 68 and the movable knife blade 162, and with a downwardly projecting tongue 169 which supports a ledge 170 beneath the path of the ticket strip S, which is encountered by the ticket after it has been severed and released and deflects the ticket to fall downward and be received within the walls of the guide pocket 171 (Fig. 2), from which it is carried to a cup (not shown) accessible from the exterior.

The hollow base 2 for the apparatus has fixed pivots 180 to support the power storing base lever 181 which has its forward end pivotally connected with the depending links 182 engaging the knife edges 183 at the front end of the weighing levers 184. The rear end of the power storing base lever 181 has a pivotal connection 185 with the lower end of the power link 4; and also has connected thereto the return weights 186 which tend normally to engage the power storing base lever 181 in a clockwise direction in Fig. 5.

The platform 3 proper has the downwardly extending legs 187 which rest on knife edges 188 and 189 carried respectively by the main weighing lever 184 and the auxiliary weighing lever 190. The auxiliary weighing lever 190 at its rear end has knife edges 191 supported by the links 192 which are pivotally mounted on pins 193 of the base 2. The front end of the auxiliary weighing lever 190 has a swinging link connection 194 to a suitably chosen point of the main weighing lever 184. It is preferred to provide connected power storing levers 181 at each side of the base, and to join these near the front by the connecting bolt 195, and at the rear by a suitable cross brace 196. Likewise, the front end of the main weighing lever 184 and the rear end of the auxiliary weighing lever 190 are bifurcated and pairs of suspension links 182 and 192 are provided for the same, these links being interconnected by the ties 197.

The power link 4 extends upwardly in the hollow column 1 (Figs. 5 and 6) and rigidly supports a bracket 200 connected to the bottom of the dashpot 201, which has a connecting rod 202 secured to the frame by a pin 203.

The method of operation of the structure is as follows: With the parts in a normal position of rest, as shown in Fig. 1, if a person steps upon the platform 3, the weight is transmitted by the depending legs 187 to the main weighing lever 184 and the auxiliary weighing lever 190 and provokes a downward movement of these levers, the auxiliary lever 190 rocking about its knife edges 191 and suspension links 192, while the main weighing lever 184 drags downward upon the knife edges 183 and suspension links 182 and causes a rocking of the power storing lever 181, this lever moving in a counterclockwise direction about its pivots 180, and at its right hand end in Fig. 5 causing an upward thrust on the power link 4. The main weighing lever 184 during this is substantially free of movement at its knife edge 188, and hence substantially no actuation of the weighing link 5 occurs.

The upward movement of the power link 4 is accompanied by a raising of the balance weight 186 and an operation of the dashpot 201 which prevents too rapid an upward movement of the power link 4.

This upward movement of the link 4 (Fig. 1) causes a clockwise rocking of the lever arm 10 and the crank lever 20 moves therewith and engages the upper wall of the notch 22 of the plunger 23 and an upward movement of the plunger 23 is produced against its own weight and against the resistance of the spring 26.

As the plunger moves upward with its clip plate 36, the dog 34 engages beneath a lug 33 on the disc 32 and turns the disc 32 in a clockwise direction, thus producing a movement of the ticket feeding disc 28 and therewith of the ticket strip S. After the disc 32 has turned through a part of its total movement, as for example, about one-tenth of a revolution when there are five lugs 33, the non-return spring pawl 38 snaps down behind the lug 33 and prevents any retrograde movement of the ticket feeding shaft. As the plunger 23 continues to rise, the bent end 43 of its pivoted pawl 41 is engaged against the periphery of the disc 32 between two of the lugs 33, and then yields against the pull of its return spring 44. At the upper limit of travel of the plunger 23, the dog 34 has rotated the disc 32 until this bent end 43 serves as a stop to prevent further movement of the disc 32; and thus there is assured an accurate and definite presentation of the ticket at the end of the strip S for printing and severing.

At the same time, the dog 52 has engaged the ratchet 51 and caused a movement of the ribbon feeding roller 50 and therewith the movement of the endless typewriter ribbon R to a new point for printing.

As the plunger 23 is moved upwardly by the lever 10 and the crank lever 20, the pin 23b on the plunger 23 moves relatively away from the detent lever 16, so that the latter may rock clockwise under the operation of its spring 18 and present its bent end 15 against the locking plate 13, ultimately snapping behind the successive teeth 14 thereof, and thus serving to prevent a retrograde movement of the lever 10 and therewith of the power link 4 and of the power lever 181 back into the original position. This likewise causes the plunger to be retained at a corresponding raised position in which power has been stored. It will particularly be noted that when the power link 4 has operated by the full distance, the lever 10 will have moved so that the detent lever 16 is behind the last tooth 14, and the crank lever 20 has moved upwardly and carried the plunger 23 with it until the angularly bent end 21 is opposite the downwardly directed end 81 of the power releasing crank lever 80. At this time, the nose of the detent 81a slips beneath the ledge 23a, and the plunger 23 is thus held against downward movement both by the detent 81a and by the pivoted member 20 as held in its raised position by the action of detent 16 upon the rock lever 10.

When approaching the upper end of its travel the pin 109 on the plunger 23 encounters the crank end 110 and causes a rotation of the shaft 111 so that the coin gate 102 is rocked to a position for transmitting the coin from the upper coin chute section 101 to the lower coin chute section 103. It will be noted that if the plunger has not reached the upper end of its travel before this operation of the coin gate 102, the latter diverts the coin and delivers it to the return chute 103a, so that it moves into the shield 170 and is returned to the exterior through the aforementioned cup.

Should the person now step from the scale platform without depositing a coin the plunger remains raised, and the platform is yet held in its lower position. The feeding of the single ticket and only one ticket is, therefore, issued each time that the plunger moves upwardly, and the detent members 13, 16 prevent the downward movement of the plunger except upon the accomplishment of a weighing operation following the deposit of a coin: and in this way, no feeding of tickets can occur except as a result of an actual weighing operation.

The power levers 181 are limited from further rocking movement, and hence the weight of the person upon the scale platform 3 now causes a rocking movement of the main weighing lever 184 and of the auxiliary weighing lever 190 which is totalized by the main weighing lever 184 and communicated as a downward pull upon the weighing link 5. As shown in Fig. 5, this results in a clockwise rocking of the upper weighing lever 131 with a pull upon the weighing spring 133 until a balance is effected corresponding to the weight of the person: this movement being slowed down to prevent breakage upon too abrupt action, by the dashpot 138. As the upper weighing lever 131 moves downward, the pivot 141 of its clip plate pulls on the sealing segment 142, so that the engagement of this sealing segment with the fixed pin 144 causes a counterclockwise movement of the same about the traveling pivot 141, against the action of the spring 146. The weighing rack 153 follows the sealing segment 142 in its downward rocking movement, being assisted in this by the small tension spring 157 which shortens the time required for the response. The rack 153 operates through the pinion 152 to move the type wheel W to a position in which the proper printing characters on its periphery are presented opposite the printing hammer 69. The periphery of the sealing segment 142 is calibrated in known manner during the construction of the machine so that the proper printing characters are presented according to the weight on the platform 3.

If now a coin be deposited in the coin chute so that it passes from the section 101 through the gate 102 into the lower section 103 and encounters the coin lever 104, it produces a relative clockwise movement of this lever and therewith the trigger finger 108 is forced against the pin 92 on the latching lever 88, so that this lever swings away and releases the dog 87 on the trip lever 79 and the latter is caused to rock upward in a counterclockwise direction about its pivot 84 by the action of its spring 86 until it encounters the lug 77 on the depending arm 73 of the sear, and causes a clockwise movement of the sear 70 about its pivot 71, thus withdrawing the upper end of the sear 70 from beneath the rearwardly projecting shaft arm 66, and permitting the transverse horizontal shaft 61 to move rapidly in a counterclockwise direction in Fig. 3 under the operation of the hammer spring 76 and the auxiliary hammer spring 76a. This movement of the shaft 61 brings the printing hammer 69 against the bottom surface of the presented ticket on the ticket strip S, so that this ticket is forced against the ribbon R and against the presented characters on the type wheel W, so that printing of the ticket occurs. This movement of the shaft 61 also brings the lever arm 68 against the movable knife 162 and forces this knife upward (Fig. 3) to sever the last ticket from the strip; for the moment the ticket remains held against the bottom of the type wheel by the pressure of the printing hammer 69.

As the pawl 70, 72, 73 rocks in a clockwise direction under the actuation of the trip lever 79, the lug 78 is ultimately presented against the horizontal end 80 of the power releasing crank lever so that the loop thereof pushes the detent 81a in a counterclockwise direction and releases the plunger 23 for downward movement: while at the same time the downwardly directed end 81 is moved against the plunger-operating crank lever 20 and the latter is disengaged also from the plunger, so that the latter is now free to fall by gravity and under the operation of the spring 26.

The coin gate 102 is immediately returned to the initial position, so that any further coin is diverted and returned to the exterior through the return chute 103a. The roller 64 pushes downward and outward upon the inner surface of the crank arm 63 and causes a relative clockwise movement of the shaft 61, thus returning the printing hammer to its initial position and releasing the knife for return by the knife spring 164. As the hammer disengages the ticket, the latter drops and is diverted by the shelf 170 so that it cannot become hung on the printing hammer 69, but falls freely downward and is delivered through the guide shield to the aforesaid cup.

During the continued downward movement of the plunger, the outwardly extending end 45 on the clip plate 36 bears against the upper edge of the trip lever 79 and rocks this trip lever downward against the action of its spring 86. The lug 87 has heretofore been resting against the end of the trigger finger 108 and holding the coin lever from return to its normal position, and as the trip lever 79 rocks downwardly, this lug 87 presses against the cam-shaped rear edge of the latching lever 88, and also permits the return of the sear 70 since it no longer supports the lug 77 thereof. The sear 70 is thus drawn back into locking position with respect to the rearwardly extending shaft arm 66 as before, so that now the hammer and knife shaft has been returned and locked ready for further operation. This return movement of the sear 70 is assisted by the operation of the spring 82 upon the crank lever 81, 80 in bearing downward upon the lug 78, wherewith also the bent end 21 of the plunger operating crank lever 20 is permitted again to rest freely upon the edge of the plunger 23. Ultimately, when the trip lever 79 has regained practically its normal position, it passes beneath the shoulder on the rear edge of the latching lever 88 and the latter can snap backward over it into the position such as represented in Fig. 4. In the meanwhile, the lug 87 has released the trigger finger 108 and the coin lever rocks in a counterclockwise direction under the operation of its counterweight 107 and is now ready for further release by a coin and during this rocking movement permits the pin 92 and therewith the latching lever 88 to regain its latching position with respect to the lug 87 and trip lever 79.

Also, during the downward movement of the plunger 23, the pin 23b encounters the free arm of the detent lever 16 and rocks this lever in a counterclockwise direction about its pivot 17, thus releasing the bent end 15 thereof from the teeth 14 so that the lever 10 is free to rock in a counterclockwise direction about its pivot 11.

During these operations, the entire mechanism has been released for printing and severing of a ticket, for the resetting of the hammer and severing devices, and for the resetting of all other parts and the release and restoration of all parts of the power mechanism to the original condition.

When the person steps from the platform 3, the power link 4 may descend under the operation of the counterweight 186, so that the power lever 181 returns and the platform 3 is raised. At the same time, the weighing levers 184, 190 regain their former position as the weighing spring 133 pulls the upper weighing lever 131 upward and draws the weighing link 5 therewith. During this movement, the sealing segment 142 travels with its pivot 141 and rocks by reason of engagement with the pin 144, thus pushing upward on the roller 156 and restoring the weighing rack 153 and the type wheel W to the original or zero position.

The parts are now ready for further operation by another person stepping upon the platform.

It will be noted that when the plunger 23 is brought to a sudden standstill at the end of its downward movement by the engagement of the cushion 119 upon the shelf 120, the inertia of the clapper 115 causes it to strike the gong 116 and sound audibly the accomplishment of the operation.

What I claim as new and desire to secure by Letters Patent is:

1. In a coin-controlled ticket-printing weighing scale having a supporting plate, a printing wheel mounted on one side of said plate and moved according to the weight being measured, and a printing hammer co-operating therewith, the combination of a hammer shaft to which said hammer is secured and located on the opposite side of said plate, and means for moving said shaft to accomplish the printing, said shaft being mounted in a plane at right angles to the axis of said printing wheel, a crank arm fastened to said shaft, a power-storing mechanism operated by the weight being measured, a detent for maintaining said mechanism in its operated position, means operated by a deposited coin for releasing said detent, and means actuated by said power-storing mechanism in its return movement after release for engaging said crank arm and thereby moving the hammer away from said printing wheel.

2. A scale as in claim 1, in which the hammer shaft is horizontal, and said power-storing mechanism includes a vertically movable plunger, said plunger having a device to wipe against the free portion of said crank and thereby move the same to withdraw the hammer from the printing wheel.

3. In a coin-controlled weighing scale, a supporting plate, a type wheel pivotally mounted at the front side of said plate on a shaft passing through said plate, said plate having an aperture located substantially directly beneath said wheel shaft, a horizontal hammer shaft journaled on the rear side of said plate, a printing hammer on said shaft and extending through said aperture, a hammer spring acting to move said shaft and hammer from a reset position into printing position, a power storage device operative after release of the detent to reset said shaft and hammer, a detent for maintaining said shaft in reset position, and means operated by a deposited coin for releasing said detent, said spring being located on the rear side of said plate.

4. A scale as in claim 3, in which a ticket-feeding mechanism is provided to feed a strip of tickets beneath said type wheel, a stationary knife extending in front of said plate and above the ticket, a loosely pivoted movable knife projecting through said supporting plate and beneath the ticket strip, and means on said hammer shaft to actuate said knife to sever the end ticket from said strip during the printing movement of said hammer.

5. In a coin controlled weighing scale, a power mechanism operated by the weight being measured whereby to store power, a detent to hold said mechanism in power storing position, a type wheel and a printing hammer cooperating therewith, means actuated by said power storing mechanism during its return movement to reset said hammer, a detent to hold the hammer in reset position, a coin operated lever, a finger fixed to said lever, a latching lever operated by said finger, means controlled by said latching lever to release said hammer detent, means operated by said hammer detent in its releasing movement to release said power mechanism detent, and means actuated by the power storing mechanism during its return movement to reset said latching lever.

6. In a coin-controlled weighing scale having a supporting plate, a type wheel mounted on one side of said plate, a horizontal shaft, a hammer secured to said shaft, a detent for maintaining said shaft in reset position, a hammer spring connected to said shaft opposite said hammer, a crank on said shaft, power-storing mechanism, a second detent for maintaining said mechanism in its power-storing position, means operated by a deposited coin for releasing said detents, and means actuated by said power-storing mechanism during its return movement to engage said crank and reset said shaft and hammer, said shaft, spring, crank, detent and means being located on the other side of the plate whereby to avoid obstruction to free downward movement of the ticket after printing.

7. In a coin-controlled weighing scale, a power-storing mechanism including a vertically movable plunger, a ticket-feeding mechanism including a ratchet wheel, a pivoted pawl carried by said plunger and engaging said ratchet wheel during the upward movement of said plunger whereby to rotate the wheel, means actuated by said plunger during its upward travel for limiting said rotating movement of said ratchet wheel, a detent for maintaining said mechanism in its power-storing position, means operated by a deposited coin for releasing said detent, said pawl being free to rock without movement of said ratchet wheel during the return movement of the plunger, and means independent of said pawl to hold said ratchet wheel in its moved position.

8. A scale as in claim 7 in which said limiting means is a member pivotally carried by said plunger and entering between teeth of said ratchet wheel near the upper limit of travel of the plunger for cooperating with the ratchet wheel to limit the rotational feeding movement thereof.

9. A scale as in claim 7, in which said limiting means is a member pivotally carried by said plunger and entering between teeth of the said ratchet wheel near the upper limit of travel of the plunger for cooperating with the ratchet wheel to limit the rotational feeding movement thereof, and a spring connected between said plunger and said member to move said member into its uppermost position and to permit said member to yield by a pivotal movement with respect to said plunger after said member encounters said ratchet wheel.

10. A scale according to claim 7, in which said independent means includes a spring pawl to engage behind a tooth of said ratchet wheel after a partial feeding movement thereof whereby to prevent a return of said ratchet to the original position, and in which said limiting means is a resiliently mounted member carried by the plunger and entering between teeth of said ratchet wheel near the upper limit of travel of the plunger for cooperating with the ratchet wheel to limit the rotational movement thereof.

11. In a coin-controlled weighing scale having a platform to be depressed by the weight being measured, a power-storing mechanism, a detent to maintain said power-storing mechanism in storage position, coin actuated means for releasing said detent, means operated by the platform to move said power-storing mechanism and including a rock lever, a toothed member on said rock lever, and a spring-actuated detent to engage said toothed member whereby to hold the platform against raising, and means on said power-storing mechanism and operated thereby during its return movement to release said detent from said member.

12. A coin-controlled weighing scale including a platform to be depressed by the weight being measured, a vertically movable power-storing plunger, a rock lever connected to the platform to move positively therewith, a pivoted member carried by said rock lever and engaging said vertically movable plunger and means to hold said member engaged therewith, said rock lever and member preventing the return movement of said plunger, a detent to hold said rock lever against return movement, coin-controlled means to release said pivoted member from said plunger whereby to permit the return movement of the latter, and means carried by the plunger and operated during its movement to release said detent from said rock lever.

13. In a coin controlled weighing scale including a vertically movable power-storing plunger, a first detent engaging a notch in said plunger to prevent the downward power developing movement thereof, a coin controlled power-releasing lever having means to move said detent from engagement with said notch, a platform to be depressed by the weight being measured, a rock lever connected to said platform to be moved thereby, a pivoted member on said rock lever and engageable with said plunger to raise the same, a second detent engageable with said rock lever to prevent the return movement thereof, said power releasing lever including means to move said pivoted member out of engagement with the plunger, and means to operate said power-releasing lever, so that said plunger may move downward independently of said rock lever.

14. In a coin controlled weighing scale including a vertically movable power-storing plunger, a detent to hold said plunger in power-storing position, a power-releasing lever engageable with the detent to move the same away from said plunger and including a horizontal arm, a horizontal pivoted trip lever having a lug, a vertical latching lever engageable with said lug to prevent upward movement of said trip lever, coin controlled means to move said latching lever, a spring to move said trip lever upwardly, a sear including a pair of lugs, the ends of said power-releasing lever and said trip lever being located between said lugs so that the trip lever will operate upon one lug when released whereby to move said sear and thereby operate said power-releasing lever, and means to move said latching lever.

15. In a coin controlled weighing scale including a vertically reciprocable power-storing plunger, a horizontal hammer shaft having a crank arm fixed thereon, an angular bent plate secured to said plunger and having means on one end to ride against said crank and move the hammer shaft to reset the hammer, a detent and coin controlled releasing means therefor, said detent being adapted to hold said plunger in its raised position, said releasing means including a trip lever and means to move the same upwardly for releasing said detent, said plate including a lug engageable with said trip lever during the downward movement of the plunger following release of said detent whereby to reset said trip lever.

16. A coin controlled weighing scale including a coin chute and a coin gate movable between non-operating to operating positions, a vertically movable power-storing plunger, a coin controlled detent to maintain said plunger in its raised position, a shaft fastened to said coin gate and extending horizontally between said coin chute and said plunger, an angularly bent end on said shaft opposite said plunger, a spring for normally holding said coin gate in non-operating position, and means carried by the plunger and engaging said angularly bent end at the completion of the plunger movement to move said coin gate to operating position, whereby upon release of said plunger by said detent the coin gate is returned by said spring to the non-operating position.

17. In a coin-controlled weighing scale including a type wheel mounted on a horizontal shaft, a hammer shaft at right angles to the axis of the wheel and located beneath it, a printing hammer carried by the hammer shaft and adapted to cooperate with the bottom of the printing wheel to print a ticket, weighing mechanism to move the type wheel, printing mechanism to store power for the operation of the printing hammer and to reset the printing hammer after operation, said printing hammer being moved by the stored power of said printing mechanism from a reset position into a printing position in cooperation with the printing wheel, a detent to hold said hammer in reset position, coin actuated means to release said detent, means to advance a ticket to a position between the printing wheel and the hammer when in the reset position, and a fixed device projecting beneath the ticket and located free of the path of the hammer and at a height between the printing and reset positions thereof, and serving to engage the released ticket and divert it away from the reset position of the hammer.

18. In a coin-controlled weighing scale, a weight-receiving platform, a weight-printing mechanism including a spring-actuated hammer, a detent lever for preventing the printing movement of said hammer, means in which power may be stored by movement of the weight-receiving platform, a second detent for restraining the return movement of the power-storing means, a spring-pressed detent lever actuating arm, a latch for holding said arm in inoperative position, a coin-controlled means for releasing the latch, said second detent including a releasing arm in the path of movement of said detent lever, and means actuated by the stored power for resetting the hammer.

19. In a weighing scale, a weight-receiving platform, a weight-printing mechanism including a spring-actuated printing hammer, a sear for restraining the movements of said hammer, a tripping lever for releasing the sear, a latch for holding said tripping lever, a coin-controlled lever for releasing the latch, means in which power may be stored by movement of the weight-receiving platform, a latch for restraining the return movement of the power storing means, means operated by the sear after the hammer has been released for releasing the latch for the stored power mechanism, and means actuated by the power storing means for resetting the hammer and for restoring said trip lever to its latching position.

20. In a weighing scale, a printing mechanism including a spring-actuated printing hammer, a sear for restraining the movements of said hammer, a spring-actuated trip lever, a latch for restraining the movements of said trip lever, a coin-controlled lever for releasing the latch, a plunger in which power is stored, a latch for restraining the movements of the plunger, a weighing platform, a rod, devices to which said rod is connected operating through said latch for raising the plunger and storing power therein, means for latching said rod in its raised position, means actuated by said trip lever for releasing said sear, means actuated by said sear for releasing the plunger from the restraining latch, and means operated by said plunger for releasing the rod.

In testimony whereof, I affix my signature.
VINCENT F. SLEZAK.